March 14, 1944.  V. HARMS  2,344,355
SEDIMENTATION APPARATUS
Filed Dec. 3, 1938  3 Sheets-Sheet 2

INVENTOR
VIGGO HARMS,
BY Arthur Miaolron
ATTORNEY.

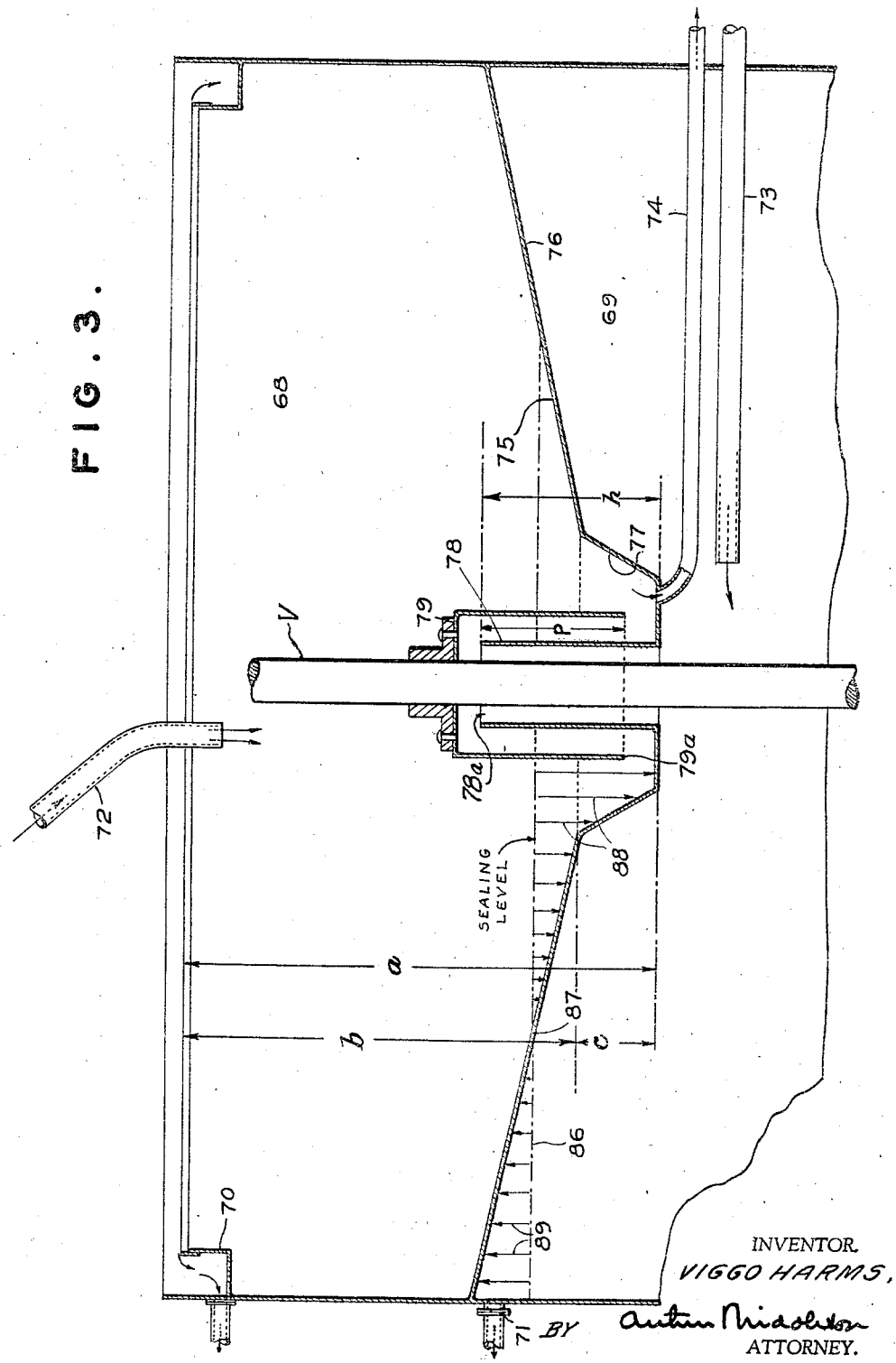

Patented Mar. 14, 1944

2,344,355

UNITED STATES PATENT OFFICE 2,344,355

SEDIMENTATION APPARATUS

Viggo Harms, The Hague, Netherlands; vested in the Alien Property Custodian

Application December 3, 1938, Serial No. 243,687

2 Claims. (Cl. 210—55)

This invention relates to continuously operating settling or thickening apparatus for separating liquid-solids mixture into a clarified overflowing liquid, and a thickened product or sludge.

An apparatus embodying the invention also comprises certain features of my copending appliaction Ser. No. 183,619, filed January 6, 1938, which has matured into Patent Number 2,239,604, which discloses what is known as a multiple compartment counter-current washing thickner in which clear overflow liquid from a lower compartment is mixed with settled solids withdrawn from an upper compartment and the mixture fed to a compartment intermediate and directly adjoining the lower and the upper compartment respectively. However, it will be understood from the following description that the thickener, according to this invention, while embodying certain features of the patented construction, differs from it basically in the mode of its operation and technical function and purpose.

More particularly this has to do with improvements in multiple compartment thickening apparatus having a series of superposed settling compartments, and exemplified by a unit having a vertical rotary shaft extending through the compartment bottoms and provided with rake arms operative in each compartment to convey or impel settled solids over the respective bottoms, and further having means for removing from each compartment the solids thus conveyed. Otherwise expressed, this relates to apparatus which in treating separated quantities of material in superposed stages multiplies the settling or treatment capacity of the apparatus within a minimum of space, without the use of separate horizontally spaced containers, additional elevators and conveying devices and with but little increase in the mechanical energy required to singly operate an apparatus of ordinary settling capacity. Briefly then, this relates to improvements in what may be called a mechanically operated multiple tray thickening unit.

In such known multiple tray type thickening apparatus several main species are discernible:

One species is designed basically for series operation of the respective settling compartments, in that the top compartment alone receives the feed, while liquid-solids mixture, or sludge passes from each compartment to the one next below, so that the material can be said to pass in series through one after the other of the compartments.

Another species is designed to have its compartments operated basically in a parallel fashion, in that each compartment operates independently in all respects from any other compartment of the unit.

Between these two extremes of species there are found modifications and compromises between the serially and parallel operating species, combining features of the one with those of another, and consequently an intermediate or third species stands out against the two others, and is characterized by what might be called a semi-parallel operation in that it provides individual feed and overflow for each compartment, whereas sludge withdrawal is effected by way of a sludge column common to all compartments.

The development of various species has had among its aims: to eliminate mechanical seals between the vertical shaft and the respective compartment bottoms, and yet to maintain each compartment as far as possible functionally independent; reducing or compensating normal as well as emergency loads upon the individual compartment bottoms; and to provide means for controlling the depth of the sludge bed individually in each respective compartment, and thereby controlling the density of the sludge. However, the attainment of one or the other of these aims, be it wholly or partially in one or the other species, has at the same time made necessary in each instance certain functional or structural or operative limitations.

In view of these or similar species known in the art to be thus limited, it is one of the objects of this invention to design a mechanically operated multiple tray thickening apparatus answering the demand for a combination of operating characteristics or method of operation not realizable in any known unit or species. Hence the unit herein contemplated should be such as to combine in it all of the following characteristics, namely, that each compartment be functionally wholly independent, with regard to its feed as well as its clarified liquid and settled solids removal, and also independent with respect to means permitting the individual adjustment of the depth of the sludge bed in each compartment; yet that mechanical seals be avoided between the compartment bottoms and the pervading vertical shaft; that load pressure upon each compartment bottom be substantially compensated for or neutralized; and that each compartment have direct potential drainage to the compartment next below, to prevent the full load to remain upon any compartment bottom in case the sustaining pressure from the next lower compartment be removed.

These objects are substantially attained by providing a unique combination of sealing and hydraulic balancing system between each two vertically superposed adjoining compartments. More specifically there is maintained a hydraulic balance between the contents of one compartment and a corresponding clear water overflow column of the next lower compartment, and also there is maintained as a part of the balanced system, a substantially stagnating body of relatively dense sludge from the upper compartment that will act as a seal against the passage of clear liquid from the lower to the upper compartment or vice versa. Otherwise expressed, there is created in connection with each compartment and intermediate any two compartments what might be called an auxiliary sludge column of relative high density to act as seal and as a partial counterbalance for the total column of liquid solids mixture within that compartment, the height of this auxiliary sludge column being variable within predetermined limits, either automatically, to compensate for changes in the general operation of the compartment, or arbitrarily, as a consequence of varying the height of the clear water overflow column of the next lower compartment.

According to one feature of construction, a boot or cylindrical portion rises from a central opening in the slightly downwardly conical compartment bottom, and is surrounded by a hood portion. The auxiliary or stagnating sealing sludge column is established in the annular space between the boot and the hood, and sludge, including possible grit, is withdrawn from the bottom substantially at the lowest point thereof at a rate to maintain the auxiliary sludge column effective as a sealing medium, while maintaining the aforementioned adjustable hydraulic balance condition between the compartments as a potential means of individually controlling the depth of the sludge bed in each compartment. According to this arrangement, a relatively small but downwardly acting load pressure is maintained upon the compartment bottom in order to establish a desired stress condition thereof.

According to another feature, an annular sump-like depression is provided in the central portion of the compartment bottom at the foot of the rising boot, which depression collects sludge at a relatively high density, and permits it and the potential grit therein to be promptly withdrawn, avoiding congestion at this point and the possible disturbance of the proper desired hydraulic balance conditions between the compartments. More specifically, the dimensions of the annular sump-like depressions are such that a dual advantage or desirable compromise is obtained, namely, a far-reaching compensation of load pressure upon the compartment bottom along with a far-reaching potential drainage of the contents of the compartment incident to drainage of the compartment next below.

The invention possesses other objects and features of advantage, some of which with the foregoing will be set forth in the following decription. In the following description and in the claims, parts will be identified by specific names for convenience, but they are intended to be as generic in their application to similar parts as the art will permit. In the accompanying drawing there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which:

Fig. 1 is a vertical section of a structural example of the multiple compartment thickening unit or tank embodying the principle of this invention, namely the operation in parallel of the individual compartments, whereby feed liquid from a common source is passed individually to each compartment, and settled matter is withdrawn from each compartment to a point of discharge from the tank outside the apparatus, while clarified liquid is allowed to overflow from each compartment for discharge from the apparatus.

Fig. 3 is a still further enlarged diagrammatic view similar to that of Fig. 2, with additional features of improvement embodied as in the hydraulic sealing arrangement between the first and the second compartment of the thickener unit.

Figure 1:
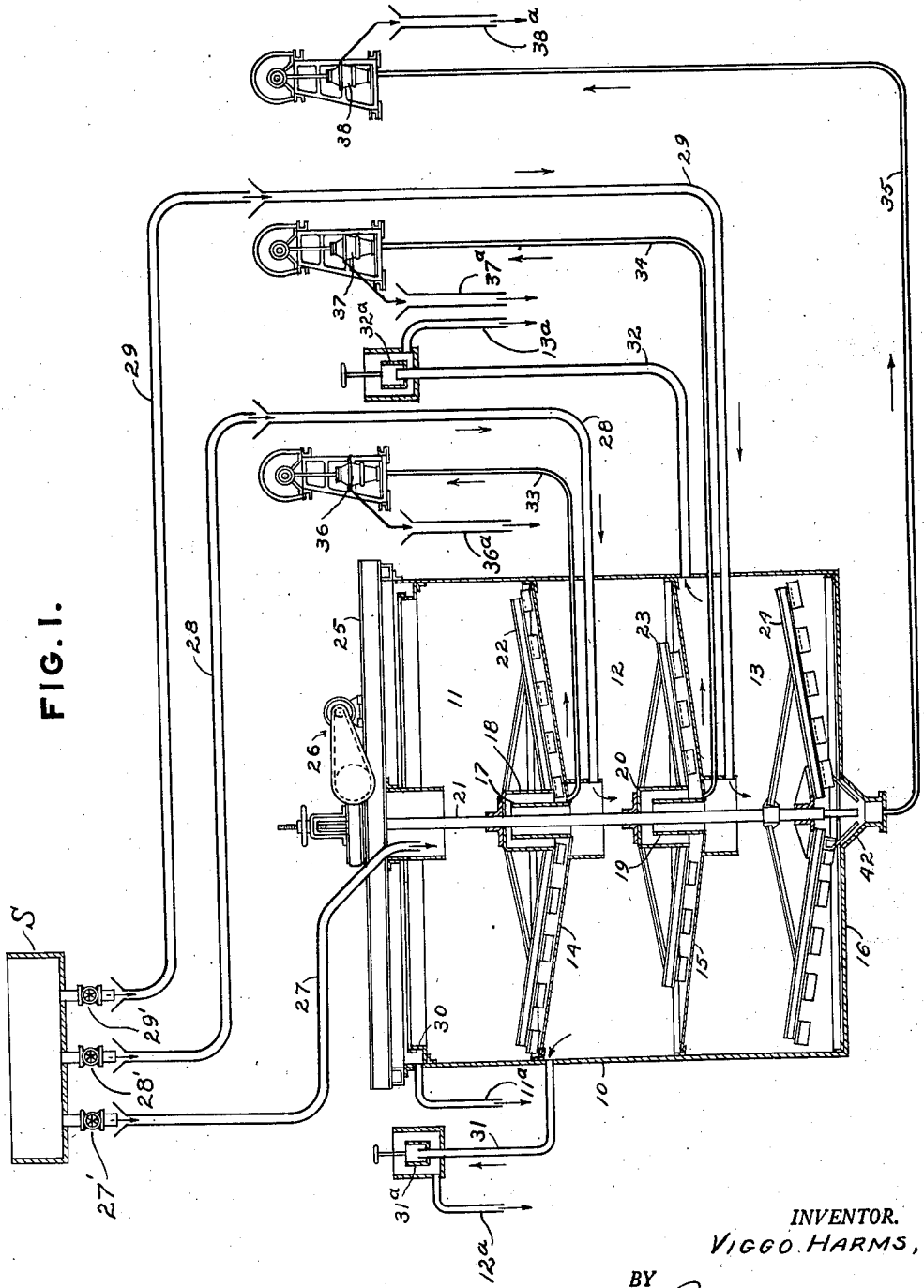

Fig. 1 shows a structural embodiment of the multiple-compartment thickening unit having embodied therein the principle of the present invention. In Fig. 1 a tank 10 is divided into vertical superposed settling compartments 11, 12, 13, having bottoms 14, 15, 16, respectively. The compartments are hydraulically connected with one another and sealed as well, by way of a communication arrangement disposed between compartments 11 and 12, comprising an upcast collar or boot 17 and a hood portion 18 surrounding the same, and by way of a similar conduit arrangement between compartments 12 and 13, comprising a rising boot 19 and a hood portion 20. A vertical settled-solids rotary raking device in the tank comprises a vertical shaft 21, having sets of radially extending rake arms 22, 23, 24, disposed in the respective compartments 11, 12, 13, with the hood portions 18 and 20 constituting a part of the rotary system. The vertical shaft is shown to be supported from members 25 placed across the top of the tank. A motorized drive mechanism for the shaft is indicated at 26. Each of the three compartments is fed a liquids-solids mixture or feed liquid containing solids in suspension through connections 27, 28, 29. The feed liquid for these three connections is shown to be supplied from a common source represented by a feed box S having controllable outlets 27', 28' and 29' for the respective feed connections 27, 28 and 29. The liquids-solids mixture in each compartment is separated into a thickened product and a clear overflow liquid. Consequently, the respective compartments have clear liquid overflows, as indicated by a launder 30 for compartment 11, and overflow pipes 31 and 32 for compartments 12 and 13 respectively, each overflow pipe having adjustable sleeves 31a and 32a respectively, for the purpose of varying the overflow level. Overflow discharge connections for the compartments 11, 12, 13 are shown at 11a, 12a and 13a respectively.

The thickened product or sludge or settled solids are engaged by the raking blades of the rotary arms 22, 23 and 24 respectively, and impelled over the respective compartment bottoms towards the center of each compartment. Consequently the sludge is withdrawn from each respective compartment, as by way of suction pipes 33, 34, 35 connected with pumps 36, 37, 38 disposed as shown at the upper level of the tank. The settled matter discharged by the pumps in the form of sludge is indicated as being disposed of by way of respective discharge pipes 36a, 37a and 38a. The sludge discharging from these three pipes may be disposed of individually or be collected in a common container not shown.

Figure 2:
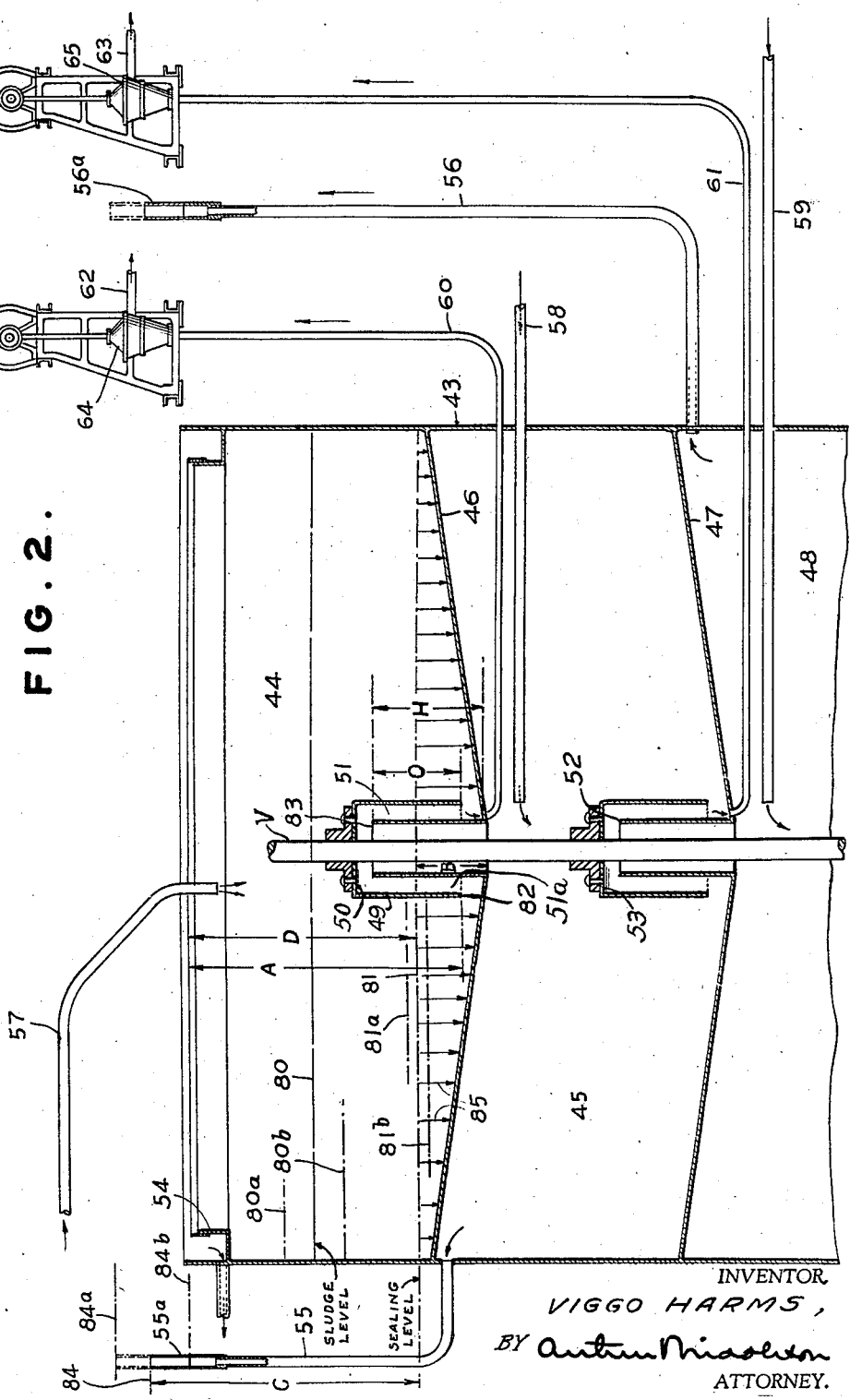
Fig. 2 is a somewhat enlarged diagrammatic fractional view of the thickener unit of Fig. 1, with such changes and indications as will serve to illustrate more precisely the novel function and principle of operation according to this invention.

The schematic showing of the tank compartments in Fig. 2 is intended for the understanding of the dual function of the respective communication arrangements between the compartments, namely, as a sealing means and as potential emergency outlet, and further for the understanding of the character of the hydraulic balance conditions thus involved, and further for the understanding of how each compartment is individually controlled and how a desired state of load compensation with regard to the compartment bottoms is attained, and how the automatic emergency drainage of each compartment works.

Fig. 2, therefore, limits the showing of the raking mechanism as found in Fig. 1, to the mere indication of a portion of the vertical rotary shaft that corresponds to the shaft 21 shown in Fig. 1. This fractional indication of the shaft is represented in Fig. 2 by the shaft portion V. Therefore, the apparatus embodying the invention and diagrammatically presented in Fig. 2 is understood to include a rotary raking mechanism such as that shown in Fig. 1. It will thus also be understood that the hood 50 in the Fig. 2 embodiment and likewise the hood 79 in the Fig. 3 embodiment, is fixed to and rotates with the vertical shaft V of the rotary sludge raking mechanism.

For the present purpose of explaining the principle of operation involved according to Fig. 2, a tank 43 is fractionally and diagrammatically shown to include a top compartment 44 and a next following lower compartment 45, both compartments defined by their bottoms 46 and 47 respectively. The fraction of a third lower compartment is indicated at 48. The conduit arrangement between the compartments 44 and 45 comprise a rising boot or conduit portion 49 and a hood member 50 surrounding the same, both defining an annular space 51 in which settled solids from compartment 44 are adapted to get trapped so as to constitute therein a substantially stagnating body of relatively dense sludge or dense sludge column 51a to act as a seal against the next lower compartment, and which functions in the manner hereinafter to be described. It is noted that the hood 50 is fixed to and supported by the shaft V and hence rotatable as a unit therewith.

A similar conduit arrangement is provided between compartment 45 and 48, again comprising a rising boot or conduit portion 52 and a surrounding hood member 53. The overflow for the top compartment 44 is indicated by way of overflow launder 54 and the next following compartments 45 and 48 having overflow pipes indicated at 55 and 56 respectively.

Feed connections for the three superposed compartments are shown at 57, 58, 59, and they are shown in distinction from those disclosed in Fig. 1 to be potentially independent as to their source of feed, and more specifically independent in so far as the source of feed of any one compartment need have no relation to the overflow or solids withdrawal connection of any of the other compartments.

With respect to the independence of operation of each compartment, Fig. 2 also provides settled solids withdrawal connections 60 and 61 for the respective compartments 44 and 45, each one of which withdrawal connections is indicated to deliver to any individual destination as indicated at 62 and 63 respectively; that is to say, by means of sludge suction pumps 64 and 65. Adjustable sleeves 55a and 56a to vary the overflow elevation are shown in conjunction with the respective overflow pipes 55 and 56.

Fig. 3 is similar in its diagrammatic character to Fig. 2, although in a further enlarged scale showing but a top settling compartment 68 along with a portion of the next lower compartment 69, it being understood that any number of compartments may thus be superposed. This enlarged diagrammatic showing will mainly illustrate a refinement per se in the zone of the central sealing arrangement, presently to be described.

An overflow for the upper compartment 68 is shown by way of an overflow launder 70, the next lower compartment 69 having an overflow pipe fractionally indicated at 71. At 72 and 73 respectively there are indicated feed connections to serve the respective compartments 68 and 69. A settled solids withdrawal connection for the top compartment 68 bears the numeral 74.

The bottom 75 of the top compartment 68 has a customary downward slight conical shape as expressed in the main portion 76 thereof, and it is centrally formed with an annular depression or sump-like portion 77 from the bottom opening of which rises a collar or boot 78 surrounded by a hood member 79. This again constitutes the communication arrangement between two compartments similar in effect to the ones previously described in conjunction with the Figs. 1 and 2, and serving as a sealing arrangement between the upper and the lower compartment. The solids withdrawal connection 74 leads from the lowest point of the annular sump portion 77 and is adapted to withdraw sludge of relatively highest density from the compartment along with whatever grit may accumulate at the bottom of the sump portion.

A rotary raking mechanism similar to that including the shaft 21 in Fig. 1, is not shown in the Fig. 3 embodiment of this invention except by showing a portion of the shaft V which corresponds in function to the shaft 21 shown in Fig. 1. The shaft V is accordingly unitary with the hood 79.

The principle of operation will now be explained by way of referring to the operation of the top compartment 44 in Fig. 2, it being understood that any other compartment of the unit may be operated in a similar fashion and on the same principle.

Let us assume a uniform set of operating conditions such as uniform rate of feed through connection 57, a uniform rate of settled solids withdrawal through connection 60 and pump 64, and the character of the feed to be substantially uniform with regard to density and other characteristics. There will then have established itself in the course of continuous and substantially stabilized operation, a bed of sludge in the compartment, the depth of which bed is indicated by the sludge level 80. The depth of this sludge level has a bearing upon the degree of density of the thickened product at the bottom, especially where the solids are of a relatively light or flocculent nature, and the controllability of the height of the sludge level is therefor desirable and important, and hence it is important that in the present instance the sludge level is individually and independently controllable in each compartment in a certain manner as will be explained.

Another characteristic level is important with regard to the principle of operation, namely, the level of the body or column 51a of relatively dense sludge trapped in the annular space 51 of the communication arrangement connecting the compartment 44 with the next lower compartment 45. This level herein to be termed the "sealing level" 81, is the basis or reference line for the hydrostatic equation hereinafter to be discussed. In this connection, it will hereinafter be seen that theoretically this "sealing level" may be allowed to vary within limits defined by the lower edge 82 of the hood member 50 on the one hand, and the upper edge 83 of boot 49 on the other hand, the distance or operating range between these two limits being indicated by the letter O.

The hydrostatically balanced system underlying the operation of the unit comprises the clear water column in the overflow pipe 55 leading from the lower compartment 45, the body of liquid solids mixture and sludge respectively within the upper compartment 44, and the liquid that fills the communication connecting the lower compartment 45 with the upper compartment 44. For the purpose of the present consideration let it be assumed that the overflow sleeve 55a which defines the overflow level of the clear water column 55 has been adjusted to an intermediate position (shown in heavy lines), defining the overflow level 84, and that accordingly the "sludge level" 80 and the "sealing level" 81 have established themselves in corresponding intermediate positions. For the purpose of setting up the underlying hydrostatic equation, the lower edge 82 of the hood 50 is to be taken as the reference point, or lowest point of the hydrostatic system, the respective depth of the body of solids bearing liquid in compartment 44 being designated as A, the respective depth of the dense sludge column trapped in the conduit as B, and the respective height of the clear water column counting from the "sealing level" 81 to the overflow level 84 as C.

Consequently, the equation representing the hydrostatic balance is:

$$A = B + C$$

It will thus be seen that with a state of operating equilibrium established, the compartment 44 will operate independently of the next lower compartment and so on down with regard to any other compartment of the unit. In this way, as long as the sealing level 81 is maintained duly within the limits of the range O, no clear water from the lower compartment 45 can escape past the edge 82 into the upper compartment and vice versa, no settled solids can be transferred over the edge 83 from the upper compartment 44 into the lower compartment 45, and hence the sludge column 51a represents in effect a stationary or stagnating sealing body although qualified to provide flexibility of operation to the extent that the sealing level 81 may adjust itself, or else, may be arbitrarily adjusted to any position within the limits of the range O, in view of the three variables in the above basic Equation: $A = B + C$.

To maintain the compartment within the range of proper operating conditions, the rate of feed through connection 57 must not be out of proportion with the settling capacity of the compartment, and it must be in proportion with the rate of solids withdrawal to avoid congestion. The rate of sludge withdrawal through connection 60 on the other hand must not be so hight as to draw the sealing level 81 down to a point where it would permit the escape of clear water from the lower into the upper compartment, and similarly the overflow level 84 must not be raised to a point where it will force clear water from the lower compartment 45 through the conduit into the upper compartment 44.

It will then become apparent, however, that the adjustability of the overflow sleeve 55a is an arbitrarily controllable factor which when properly used constitutes a direct and simple means for helping to control the depth of the sludge bed, that is a desired position of the sludge level 80. The raising and lowering respectively of the overflow level of sleeve 55 (in view of Equation $A = B + C$), will cause a concurrent change in the position of the sealing level 81. For example, when the overflow level 84 is raised, say, to a position 84a, this will cause a corresponding depression of the sealing level 81, for instance to a position 81b, and, vice versa, the lowering of overflow level 84, say, to a position 84b, will in turn raise the sealing level 81, say, to a position 81a. Due to the difference in the respective specific gravities of clear liquid and dense sludge, the variations of the sealing level 81 will be relatively small, and the adjustment of the sealing level 81 in response to any readjustment of the overflow level 84 will be immediate, and otherwise without affecting the operating factors in any of the other compartments, because of the relatively minute quantity of dense sludge that is displaced from the sludge bed into the column 51a or vice versa.

Similarly if the sludge level 80 is caused to rise, intentional or unintenionally, say, to the position 80a, this will in a certain proportion slightly raise the sealing level 81, say, to a position 81a, and conversely if the sludge level 80 falls, say, to a position 80b, this will slightly lower the sealing level 81, say, to a position 81b. In other words, a relatively wide range of fluctuations of the sludge level 80 is feasible with a relatively small range of corresponding fluctuations of the sealing level 81.

Hence, when the sealing level 81 moves either up or down farther than desired, its desired position can be restored or adjusted directly by way of an intentional compensating adjustment of the overflow level 84, and without affecting any of the operating factors in any of the other compartments of the unit. Consequently, there is available an automatically responsive flexibility of operation, because the depth of the sludge bed or sludge level 80 is allowed to vary within relatively wide limits owing to accidental changes in any of the operating factors, without disturbing the proper function of any or all of the respective compartments; or a substantial change in the depth of the sludge bed in one compartment may be caused intentionally, as it were, by changing the rate of sludge withdrawal or otherwise, and consequently a proportionate intentional adjustment may be made by way of adjusting the overflow level of the next lower compartment, in order to compensate for an undue amount of shifting of the sealing level 81.

Another feature has to do with a compensation of load pressure upon the compartment bottoms, and will be explained by way of analyzing the load reactions in the bottom 46 of the top compartment 44 (see Fig. 2). Resorting again to the hydrostatic equation $A = B + C$, it is approximately true that the downward pressure upon the bottom due to the partial depth D of the contents of the compartment (D being the depth from the "sealing level" to the overflow level of launder 54) is compensated by upward pressure exerted upon the bottom due to the pressure of the clear water column C in the overflow line 55. Consequently, there remains of the contents of the upper compartment, the portion below the "sealing level" 81, the load of which upon the bottom is partly not compensated, and which load is equivalent to the solids contained in that portion, the weight and weight distribution of which upon the bottom is indicated by the length of arrows 85 filling the area between the "sealing level" 81 and the bottom 46. It thus appears that with the sealing arrangement according to Fig. 2, there is effected a load compensation with the result that a relatively slight, although at all times positive downwardly acting pressure is exerted upon the compartment bottom, thus creating therein mild tension stresses which a slightly conical shaped bottom, such as the one shown, can readily and effectively absorb.

In case of accidental drainage of the tank, that is when the sustaining upward pressure from the liquid in the compartment 45 disappears, the main portion of the contents of compartment 44 will naturally drain through the existing central communication into the compartment 45 as the seal therein is being broken, and so on through the unit, leaving in each compartment but a remainder the volume of which evidently corresponds to the reight H of the boot 49, and the absolute weight of which remainder the bottom should be able to carry.

In the light of the foregoing explanations with respect to Fig. 2, the importance of the refinements embodied in the communication and sealing arrangement of Fig. 3 will now be readily understood. It will be seen that due to the annular sump-like depression 77, the top edge 78a of the boot appears lowered with respect to the main body portion 76 of the bottom, with the result that in case of accidental drainage there will be left but a relatively small remainder of sludge to constitute actual load upon the bottom, this remainder, of course, being defined by the height h of the boot 78. The annular depression 77 further lends itself for collecting and concentrating therein gritty matter that is contained in or segregated from the thickened product, and in this way the prompt removal of the gritty solids through withdrawal connection 74 is facilitated.

In connection with Fig. 3 it is furthermore observed that under average operating conditions to be assumed therein, the sealing level 86 is relatively lower as compared with the arrangement shown in Fig. 2, and incidentally intersects with the conical bottom portion 76 as at 87. In such case load pressures upon the bottom due to solids load are approximately fully neutralized, inasmuch as downward pressure acts upon the central portion of the bottom from solids present below the sealing level 86 in the sense and intensity indicated by arrows 88, whereas upward pressure acts upon the outer annular portion of the bottom in the sense and intensity indicated by arrows 89, the respective pressure effects again being due to the difference in specific gravity of sludge upon the bottom and the clear water below.

I claim:
1. Apparatus for settling the solids from liquids having solids in suspension, which comprises a tank structure divided by a partition into a lower compartment and an upper settling compartment vertically disposed immediately above the lower compartment, each compartment adapted to have established therein a sludge bed of settled solids, said partition having a central opening, an upcast boot surrounding said opening and rising from said partition, a hood encircling the boot and constituting therewith hydraulic communication means between the upper and the lower compartment, which communication means is adapted to have trapped therein a substantially stationary column of sludge comprising settled solids, rotary sediment raking mechanism comprising a vertical rotary shaft extending through said boot and said hood and having arms adapted to impel settled solids over said partition to discharge, individually operable means for continuously feeding separately to each compartment liquid having solids in suspension, means for withdrawing settled solids material from the bottom of the upper compartment to a point of discharge from the tank outside the apparatus at a rate low enough to maintain a trapped body of settled solids in said communication means, means for overflowing supernatant liquid separately from each compartment and for discharging said liquid from the apparatus, and means for adjusting the overflow levels with respect to each other and in a manner to control the effective height of the trapped sludge column, said compartments thus being operable in parallel.

2. Apparatus for settling the solids from liquids having solids in suspension, which comprises a tank structure divided by a partition into a lower compartment and an upper settling compartment vertically disposed immediately above the lower compartment, each compartment adapted to have established therein a sludge bed of settled solids, said partition having a central opening, an upcast boot surrounding said opening and rising from said partition, said boot forming with the adjacent surrounding portion of the partition an annular trough-like depression from which collected settled solids are adapted to be withdrawn, a hood encircling the boot and constituting therewith hydraulic communication means between the upper and the lower compartment, which communication means is adapted to have trapped therein a substantially stationary column of sludge comprising settled solids, rotary sediment raking mechanism comprising a vertical rotary shaft extending through said boot and said hood, and having arms adapted to impel settled solids over said partition to discharge, individually operable means for continuously feeding separately to each compartment liquid having solids in suspension, means for withdrawing settled solids material from the trough-like annular depression of the upper compartment to a point of discharge from the tank outside of the apparatus at a rate low enough to maintain a trapped body of settled solids in said communication means, means for overflowing supernatant liquid separately from each compartment and for discharging the liquid from the apparatus, and means for adjusting the overflow levels with respect to each other and in a manner to control the effective height of the trapped sludge column, said compartments thus being operable in parallel.

VIGGO HARMS.